US008842938B2

(12) United States Patent
Li et al.

(10) Patent No.: US 8,842,938 B2
(45) Date of Patent: Sep. 23, 2014

(54) METHOD AND SYSTEM FOR PERFORMING RESOLUTION EXPANSION WITH HIGH QUALITY EDGE ENHANCEMENT

(75) Inventors: Xing Li, Webster, NY (US); David Metcalfe, Marion, NY (US); Barbara Lynn Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 250 days.

(21) Appl. No.: 13/534,260

(22) Filed: Jun. 27, 2012

(65) Prior Publication Data
US 2014/0002459 A1   Jan. 2, 2014

(51) Int. Cl.
*G06K 9/32*   (2006.01)

(52) U.S. Cl.
USPC ............................................. 382/299; 358/2.1

(58) Field of Classification Search
None
See application file for complete search history.

(56) References Cited

U.S. PATENT DOCUMENTS

| | | | |
|---|---|---|---|
| 4,460,909 A | 7/1984 | Bassetti et al. | |
| 5,937,147 A | 8/1999 | Ng | |
| 6,020,979 A * | 2/2000 | Zeck et al. | 358/1.9 |
| 6,021,256 A | 2/2000 | Ng et al. | |
| 6,185,328 B1 * | 2/2001 | Shiau | 382/173 |
| 6,347,153 B1 * | 2/2002 | Triplett et al. | 382/224 |
| 6,798,538 B1 | 9/2004 | Yamada et al. | |
| 7,002,709 B1 * | 2/2006 | Terada et al. | 358/3.28 |
| 7,379,626 B2 | 5/2008 | Lachine et al. | |
| 2004/0150684 A1 * | 8/2004 | Sanger et al. | 347/15 |
| 2005/0270582 A1 * | 12/2005 | Hara | 358/2.1 |
| 2006/0087695 A1 * | 4/2006 | Keithley et al. | 358/3.06 |
| 2007/0223044 A1 * | 9/2007 | Bailey et al. | 358/3.06 |
| 2008/0239352 A1 * | 10/2008 | Jun | 358/1.9 |
| 2009/0097776 A1 * | 4/2009 | Fukamachi et al. | 382/269 |
| 2009/0153923 A1 * | 6/2009 | Lin | 358/505 |
| 2009/0225372 A1 * | 9/2009 | Ikeda | 358/3.13 |
| 2010/0225973 A1 * | 9/2010 | Keithley et al. | 358/3.06 |
| 2010/0290089 A1 | 11/2010 | Stevens | |
| 2011/0051197 A1 | 3/2011 | Yao et al. | |
| 2011/0243429 A1 * | 10/2011 | Yao | 382/162 |
| 2011/0249895 A1 * | 10/2011 | Lin | 382/167 |
| 2012/0020570 A1 | 1/2012 | Yao et al. | |
| 2012/0147431 A1 * | 6/2012 | Kashibuchi | 358/3.27 |
| 2013/0135685 A1 * | 5/2013 | Kakutani | 358/3.06 |
| 2013/0250363 A1 * | 9/2013 | Yao | 358/3.06 |
| 2013/0321871 A1 * | 12/2013 | Uchidate | 358/3.05 |

* cited by examiner

*Primary Examiner* — Jingge Wu
(74) *Attorney, Agent, or Firm* — Kermit D. Lopez; Luis M. Ortiz; Ortiz & Lopez, PLLC

(57) ABSTRACT

Methods and systems for performing resolution expansion with high quality edge enhancement capability utilizing an edge detector and a color estimator. An edge tag with respect to an input image can be detected via an edge detector and an edge detection approach. A resolution expansion can be separately applied to the edge tag and a binary output generated by other processing functions. Multiple output lines corresponding to the input image from the color estimator with different threshold array values for an edge pixel can be generated by a halftoning module. A binary domain resolution expansion can be applied for a non-edge pixel. A final output for each pixel can be selected from a resolution expanded result and/or from the result of the halftoning for the edge based on the edge tag with respect to that pixel.

17 Claims, 4 Drawing Sheets

METHOD AND SYSTEM FOR PERFORMING RESOLUTION EXPANSION WITH HIGH QUALITY EDGE ENHANCEMENT

TECHNICAL FIELD

Embodiments are generally related to rendering devices such as, printers, multi-function devices, photocopy machines, fax machines and the like. Embodiments are also related to binary image processing. Embodiments are additionally related to resolution expansion with high quality edge enhancement.

BACKGROUND OF THE INVENTION

Networked devices such as, for example, multi-function devices, scanners, photocopy machines, client devices, file servers, print servers, and work flow engines can be employed in a wide variety of production environments such as, for example, print shops, offices, education institutions, drug stores, libraries, computer labs and the like. Such networked rendering devices can communicate with client devices to assist in providing various rendering operations such as printing, scanning, and other operations.

Digital images produced by an image-forming device can be processed utilizing edge enhancement techniques to improve sharpness and reduce the jaggedness of halftoned text and line arts. In multi-functional devices subject to RIP (Raster Image Processing) performance considerations and other factors, there is often a need for an image path to convert an input image at a relatively lower resolution to the resolution of a marking engine. Conventional approaches replicate the pixels and/or lines to convert the input image to the resolution of the marking engine. Such pixel/line replication processes, however, are limited in achieving edge quality improvement with respect to the binary image-processing system utilized.

Based on the foregoing, it is believed that a need exists for improved methods and systems for performing resolution expansion with high quality edge enhancement, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved networked rendering device such as, for example, a printer, scanner, photocopy machine, fax machine, and/or a MFD.

It is another aspect of the disclosed embodiments to provide for an improved system and method for performing resolution expansion with high quality edge enhancement.

It is a further aspect of the disclosed embodiments to provide for an improved method and system for performing edge detection and color estimation utilizing an edge detector and a color estimator.

The aforementioned aspects and other objectives and advantages can now be achieved as described herein. A method and system for performing resolution expansion with high quality edge enhancement capability utilizing an edge detector and a color estimator is disclosed herein. The edge detector utilizing a standard edge detection approach can detect an edge tag with respect to an input image. A resolution expansion can be separately applied to the edge tag and a binary output generated by other processing functions. Multiple output lines corresponding to the input image from the color estimator with different threshold array values for an edge pixel can be generated by a halftoning module. A binary domain resolution expansion can be applied with respect to a non-edge pixel.

A final output for each pixel can be selected from a resolution expanded result of other processing units and/or from a result of halftoning for the edge based on the edge tag with respect to that pixel. A color estimate may be generated by the color estimator based on image data. Regions of high detail such as, for example, edges in the binary image can be converted to a desired resolution through the use of an edge detector and a color estimator. An edge tag smoothening module can be employed to smoothen an outline of the edge tag. Such an approach can thus re-render halftoned edge pixels at a higher frequency to avoid a jaggy appearance and can handle resolution expansion with a high quality edge enhancement capability.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
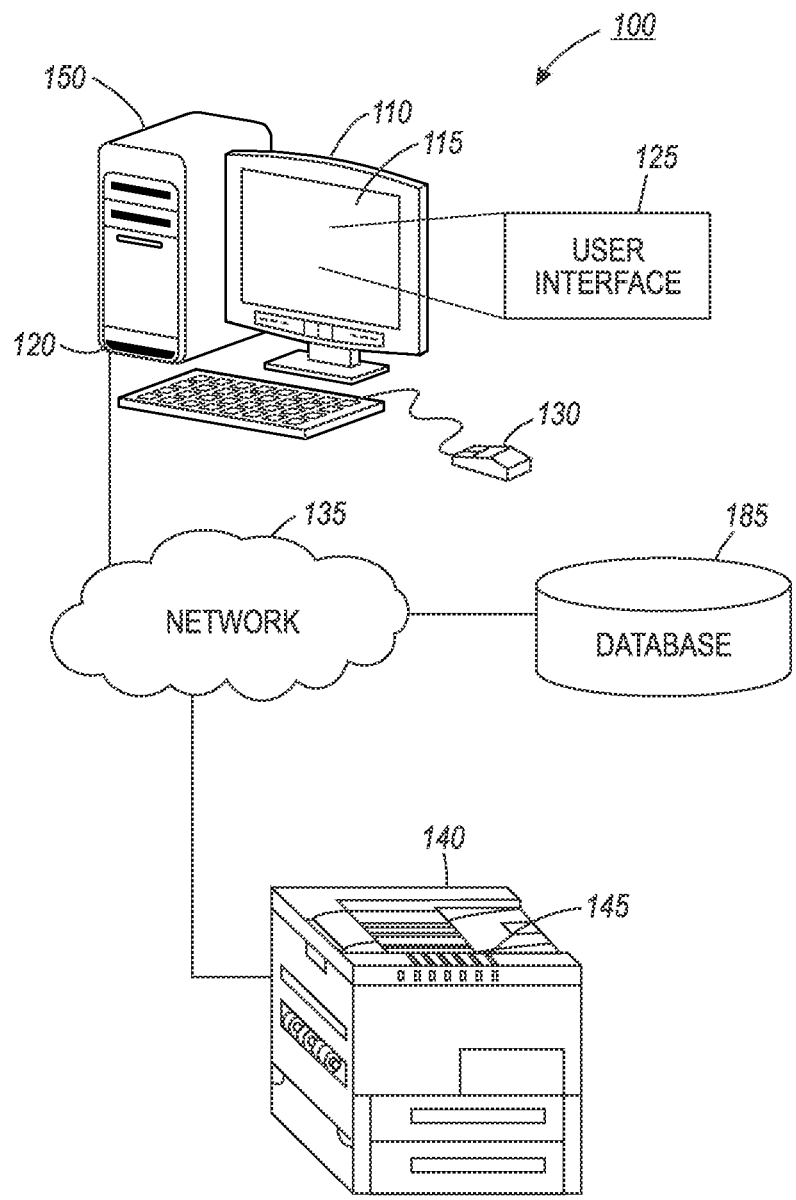
FIG. 1 illustrates an example of a rendering device coupled to a data-processing apparatus through a network, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining software and hardware aspects all generally referred to herein as a "module". Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

Referring to FIG. 1, system 100 can be configured to include one or more networked devices such as a networked device 140 coupled to a data-processing apparatus 110 through a network 135. In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard, and a pointing device 130 (e.g., mouse, track ball, pen device, or the like). Additional input/output devices, such as the multifunction device 140 may be included in association with the data-processing apparatus 110 as desired.

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the multifunction device 140 may be implemented with a single rendering function such as printing. In other embodiments, the multifunction device 140 can be configured to provide multiple rendering functions such as scanning, faxing, printing and copying.

A non-limiting example of a MFD that can be utilized as multifunction device 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as multifunction devices 140 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as multifunction devices 140 is disclosed in U.S. Pat. No. 5,920,405, entitled "Multifunction Device With Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn. Additionally, U.S. Patent Application Publication No. 2010/0290089 entitled "Method and System for Selective Smoothing of Halftoned Objects Using Bitmap Encoding" which published on Nov. 18, 2010, is incorporated herein by reference and contains general background information regarding, for example, enhancement (e.g., smoothing) of halftoned edges.

The data-processing apparatus 110 can be coupled to the multifunction device 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The networked multifunction device 140 includes a user interface 145 such as a panel menu. The panel menu may be used to select features and enter other data in the device 140. Such interfaces may include, for example, touch screens having touch activated keys for navigating through an option menu or the like. The data-processing apparatus 110 also includes a GUI 125 for communicating rendering features for processing, for example, the rendering job to a user and accepting the users selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrators portable device that communicates wirelessly may be a personal digital assistant (PDA), or the like as noted above.

The following description is presented with respect to embodiments of the present invention, which can be embodied in the context of the data-processing apparatus 110 and the networked device 140 depicted in FIG. 1. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
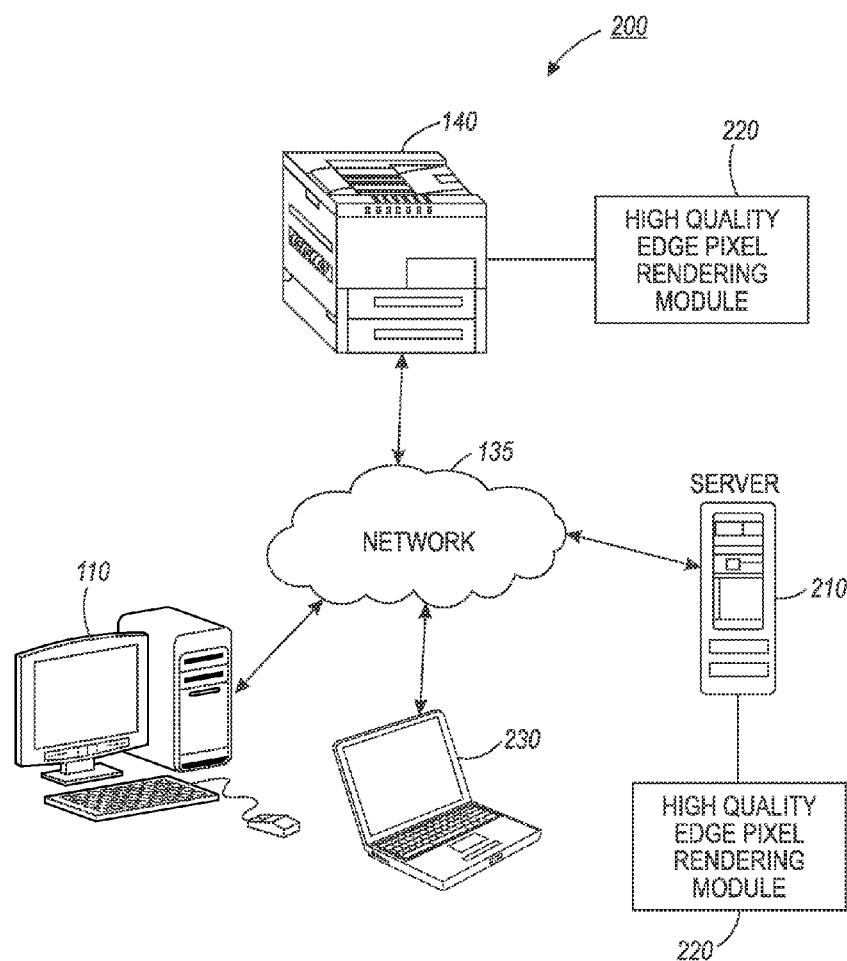
FIG. 2 illustrates a graphical representation of a digital image processing system associated with a network, in accordance with the disclosed embodiments.

FIG. 2 illustrates a graphical representation of a digital image processing system 200 associated with the network 135, in accordance with the disclosed embodiments. The digital image processing system 200 generally includes a network infrastructure 135 associated with the networked multifunction device 140, data-processing system 110, a mobile communication device (e.g., a laptop) 230, and a server 210. Data-processing system 110 depicted in FIG. 2 can be, for example, a server. Other devices such as, for example, desktops, network devices, palmtops, mobile phones, etc., may also be included in the network 135 as service providers. The multifunction device 140 can be located remotely with respect to each other, or alternatively, they may be located locally with respect to each other.

The typical multifunction device may act as a combination of a printer, scanner, photocopier, fax, and e-mail. While single multifunction device 140 are shown by way of example, it is to be appreciated that any number of rendering devices may be linked to the network such as two, three, four, six or more rendering devices. In general, the multifunction device 140 can be employed to perform a rendering output function (e.g., printing, scanning, copying, faxing, etc.) within a networked environment.

A high quality edge pixel rendering module 220 can be configured in association with the server 210 and/or a marking engine (not shown) of the multifunction device 140 for performing resolution expansion with high quality edge treatment utilizing an edge detector and a color estimator. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
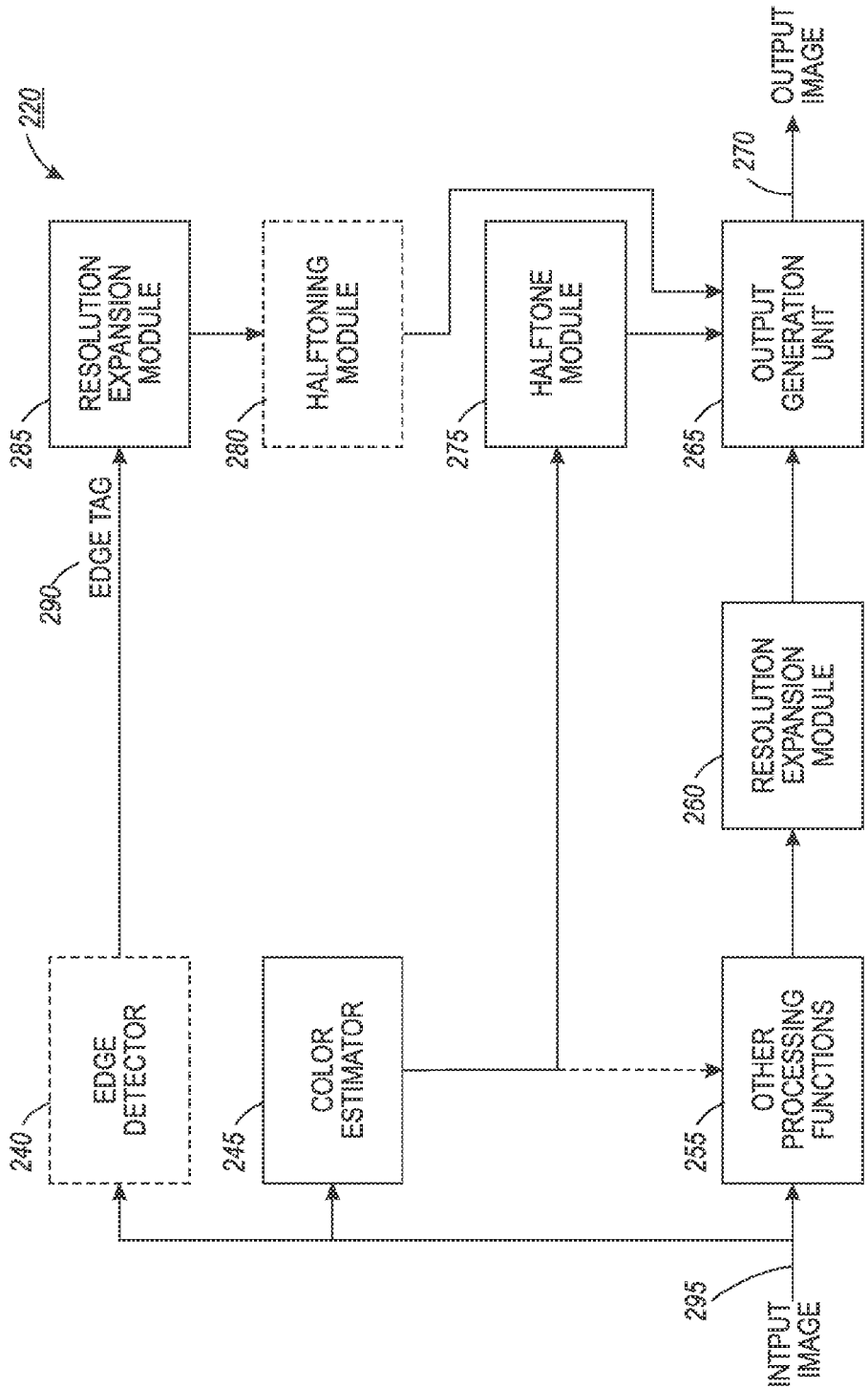
FIG. 3 illustrates a detailed block diagram of a high quality edge pixel rendering module for performing resolution expansion with edge enhancement, in accordance with the disclosed embodiments.

FIG. 3 illustrates a block diagram of the high quality edge pixel rendering module 220 for performing resolution expansion with edge enhancement capability, in accordance with the disclosed embodiments. Note that in FIGS. 1-4, identical or similar blocks are generally indicated by identical reference numerals. The high quality edge pixel rendering module 220 reduces jagged effects on an edge with respect to an image object such that an image output by the image processing system 200 can match with a real subject. The high quality edge pixel-rendering module 220 can be configured to include an edge detector 240 and a color estimator 245. The edge detector 240 can be employed to identify edges in an image 295 utilizing any standard edge detection methods, depending upon design considerations.

A color estimate may be generated by the color estimator 245 based on an image data. The binary image can be converted to a desired resolution. The regions of high detail such as, for example, edges in the binary image can be converted to the desired resolution through the use of the edge detector 240 and the color estimator 245. The high quality edge pixel-rendering module 220 further includes a resolution expansion module 285 to separately apply a resolution expansion to an edge tag 290 and a binary output generated by other processing functions 255.

A half-toning module 280 can communicate with the resolution expansion module 285 and an output generation unit 265. In some embodiments, module 280 can be configured as an edge tag smoothing module for smoothing an outline of the edge tag 290. A half-toning module 275 can be employed to automatically generate multiple output lines corresponding to the input image 295 from the color estimator 245, with different threshold array values for an edge pixel. In other words, the halftone screen can be applied on a replicated contone estimate generated from the original binary data. Halftone is the reprographic technique that simulates continuous tone imagery through the use of dots, varying either in size, in shape or in spacing. Halftone can also be employed to refer specifically to the image that is produced by this process.

A resolution expansion module 260 applies regular binary domain resolution expansion for a non-edge pixel. The resolution expansion module 260 replicates pixels/lines in the binary input image. An output generation unit 265 selects a final output 270 for each pixel from the resolution expanded result of other processing functions 255 and/or from a result of the halftoning for edge based on the edge tag 290 of that pixel. The high quality edge pixel rendering module 220 re-renders the halftoned edge pixels at a higher frequency to avoid jaggy appearances and handles resolution expansion with high quality edge enhancement capability.

Figure 4:
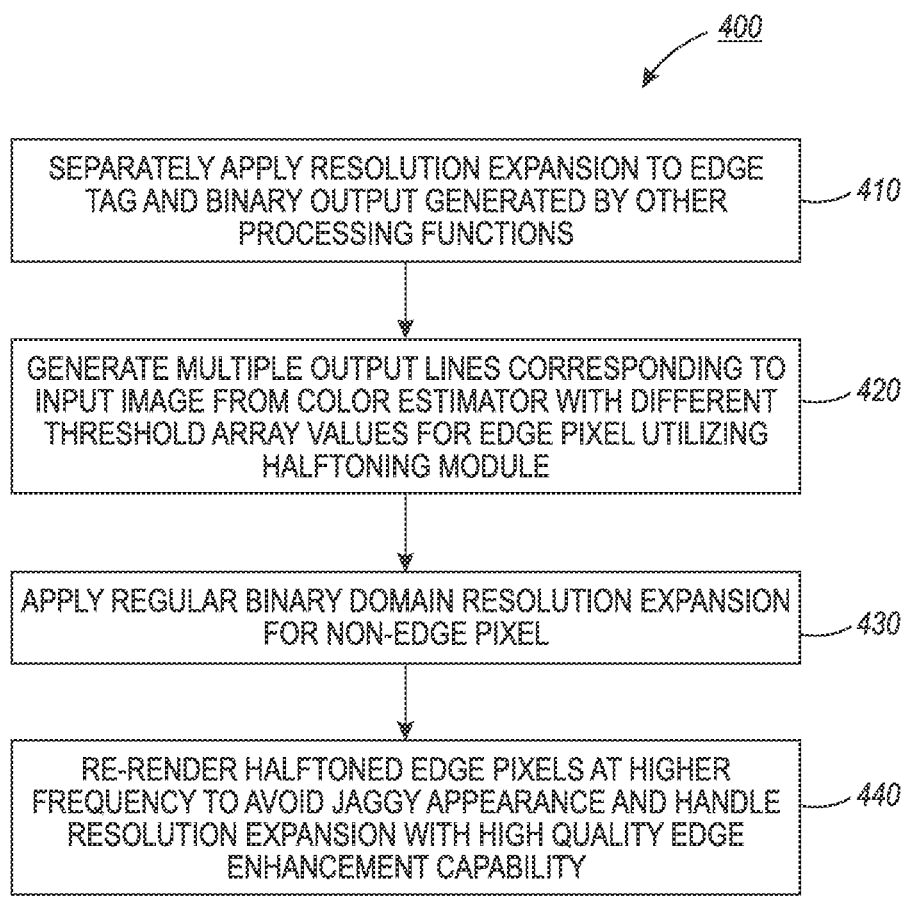
FIG. 4 illustrates a high level flow chart of operation illustrating logical operational steps of a method for performing resolution expansion with high quality edge enhancement utilizing an edge detector and a color estimator, in accordance with the disclosed embodiments.

FIG. 4 illustrates a high level flow chart of operation illustrating logical operational steps of a method 400 for performing resolution expansion with high quality edge enhancement capability utilizing the edge detector 240 and the color estimator 245, in accordance with the disclosed embodiments. It can be appreciated that the logical operational steps shown in FIG. 4 can be implemented or provided via, for example, a module such as module 220 shown in FIG. 2. Initially, the resolution expansion can be separately applied to the edge tag 290 and a binary output generated by other processing functions 255, as indicated at block 410. The halftoning module 275 generates multiple output lines corresponding to the input image 295 from the color estimator 245 with different threshold array values for the edge pixel, as shown at block 420.

A regular binary domain resolution expansion can be applied for a non-edge pixel, as depicted at block 430. Finally, the halftoned edge pixels can be re-rendered at a higher frequency to avoid a jaggy appearance and the resolution expansion can be handled with high quality edge enhancement capability, as shown at block 440.

Based on the foregoing, it can be appreciated that a number of embodiments, preferred and alternative, are disclosed herein. For example, in one possible embodiment, a method can be implemented for performing resolution expansion. Such a method can include, for example, the steps of separately applying a resolution expansion to an edge tag and a binary output; generating a plurality of output lines corresponding to an input image from a color estimator with varying threshold array values for an edge pixel by applying a halftone screen; and applying a binary domain resolution expansion for a non-edge pixel and selecting a final output for each pixel in order to re-render the halftoned edge pixel at a higher frequency to avoid a jaggy appearance and to handle a resolution expansion with a high quality edge enhancement capability.

In another embodiment, a step can be implemented for generating a color estimate by the color estimator based on image data. In yet another embodiment, a step can be provided for detecting the edge via the edge detector utilizing an edge detection approach. In still other embodiments, a step can be implemented for smoothing the outline of the edge tag utilizing an edge tag smoothening module. In other embodiments, a step can be provided for converting the edge with respect to a binary image to a desired resolution utilizing the edge detector and the color estimator. In another embodiment, a step can be provided for selecting the final output for each pixel from a resolution expanded result with respect to the plurality of processing functions. In still other embodiments, a step can be provided for selecting the final output for each pixel as a result of halftoning the edge pixel based on the edge tag with respect to the pixel.

In another embodiment, a system can be implemented for performing resolution expansion. Such a system can include, for example, a processor and a data bus coupled to the processor. Such a system may also include a computer-usable medium embodying computer program code, the computer-usable medium being coupled to the data bus. The computer program code can include instructions executable by the processor and configured for, for example, separately applying a resolution expansion to an edge tag and a binary output; generating a plurality of output lines corresponding to an input image from a color estimator with varying threshold array values for an edge pixel by applying a halftone screen; and applying a binary domain resolution expansion for a non-edge pixel and selecting a final output for each pixel in order to re-render the halftoned edge pixel at a higher frequency to avoid a jaggy appearance and to handle a resolution expansion with a high quality edge enhancement capability.

In another embodiment, such instructions can be further configured for generating a color estimate by the color estimator based on image data. In other embodiments, such instructions can be further configured for detecting the edge via the edge detector utilizing an edge detection approach. In still other embodiments, such instructions can be further configured for smoothing the outline of the edge tag utilizing an edge tag smoothening module. In other embodiments, such instructions can be further configured for converting the edge with respect to a binary image to a desired resolution utilizing the edge detector and the color estimator. In yet other embodiments, such instructions can be further configured for selecting the final output for each pixel from a resolution expanded result with respect to the plurality of processing functions. In other embodiments, such instructions can be further configured for selecting the final output for each pixel as a result of halftoning the edge pixel based on the edge tag with respect to the pixel.

In another embodiment, a processor-readable medium storing code representing instructions to cause a process for performing resolution expansion can be implemented. Such code can include code to, for example, separately apply a resolution expansion to an edge tag and a binary output; generate a plurality of output lines corresponding to an input image from a color estimator with varying threshold array values for an edge pixel by applying a halftone screen; and apply a binary domain resolution expansion for a non-edge pixel and select a final output for each pixel in order to re-render the halftoned edge pixel at a higher frequency to avoid a jaggy appearance and to handle a resolution expansion with a high quality edge enhancement capability.

In another embodiment, such code can further include code to generate a color estimate by the color estimator based on image data. In other embodiments, such code can further include code to detect the edge via the edge detector utilizing an edge detection approach. In other embodiments, such code can include code to smooth the outline of the edge tag utilizing an edge tag smoothening module. In other embodiments, such code can include code to convert the edge with respect to a binary image to a desired resolution utilizing the edge detector and the color estimator. In yet other embodiments, such code can include code to select the final output for each pixel from a resolution expanded result with respect to the plurality of processing functions; or select the final output for each pixel as a result of halftoning the edge pixel based on the edge tag with respect to the pixel.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for performing resolution expansion, said method comprising:
    separately applying a resolution expansion to an edge tag and a binary output; smoothing an outline of said edge tag utilizing an edge tag smoothing module;
    generating a plurality of output lines corresponding to an input image from a color estimator with varying threshold array values for an edge pixel by applying a halftone screen; and
    applying a binary domain resolution expansion for a non-edge pixel and selecting a final output for each pixel in order to re-render said halftoned edge pixel at a higher frequency to avoid a jaggy appearance and to handle a resolution expansion with a high quality edge enhancement capability.

2. The method of claim 1 further comprising generating a color estimate by said color estimator based on image data.

3. The method of claim 1 further comprising detecting said edge via said edge detector utilizing an edge detection approach.

4. The method of claim 1 further comprising converting said edge with respect to a binary image to a desired resolution utilizing said edge detector and said color estimator.

5. The method of claim 1 further comprising selecting said final output for each pixel from a resolution expanded result with respect to said plurality of processing functions.

6. The method of claim 1 further comprising selecting said final output for each pixel as a result of halftoning said edge pixel based on said edge tag with respect to said pixel.

7. A system for performing resolution expansion, said system comprising:
    a processor;
    a data bus coupled to said processor; and
    a computer-usable medium embodying computer program code, said computer-usable medium being coupled to said data bus, said computer program code comprising instructions executable by said processor and configured for:
        separately applying a resolution expansion to an edge tag and a binary output; smoothing an outline of said edge tag utilizing an edge tag smoothing module;
        generating a plurality of output lines corresponding to an input image from a color estimator with varying threshold array values for an edge pixel by applying a halftone screen; and
        applying a binary domain resolution expansion for a non-edge pixel and selecting a final output for each pixel in order to re-render said halftoned edge pixel at a higher frequency to avoid a jaggy appearance and to handle a resolution expansion with a high quality edge enhancement capability.

8. The system of claim 7 wherein said instructions are further configured for generating a color estimate by said color estimator based on image data.

9. The system of claim 7 wherein said instructions are further configured for detecting said edge via said edge detector utilizing an edge detection approach.

10. The system of claim 7 wherein said instructions are further configured for converting said edge with respect to a binary image to a desired resolution utilizing said edge detector and said color estimator.

11. The system of claim 7 wherein said instructions are further configured for selecting said final output for each pixel from a resolution expanded result with respect to said plurality of processing functions.

12. The system of claim 7 wherein said instructions are further configured for selecting said final output for each pixel as a result of halftoning said edge pixel based on said edge tag with respect to said pixel.

13. A non-transitory processor-readable medium storing code representing instructions to cause a process for performing resolution expansion, said code comprising code to:
    separately apply a resolution expansion to an edge tag and a binary output; smoothing an outline of said edge tag utilizing an edge tag smoothing module;
    generate a plurality of output lines corresponding to an input image from a color estimator with varying threshold array values for an edge pixel by applying a halftone screen; and
    apply a binary domain resolution expansion for a non-edge pixel and selecting a final output for each pixel in order to re-render said halftoned edge pixel at a higher frequency to avoid a jaggy appearance and to handle a resolution expansion with a high quality edge enhancement capability.

14. The processor-readable medium of claim 13 wherein said code further comprises code to generate a color estimate by said color estimator based on image data.

15. The processor-readable medium of claim 13 wherein said code further comprises code to detect said edge via said edge detector utilizing an edge detection approach.

16. The processor-readable medium of claim 13 wherein said code further comprises code to convert said edge with respect to a binary image to a desired resolution utilizing said edge detector and said color estimator.

17. The processor-readable medium of claim 13 wherein said code further comprises code to:
    select said final output for each pixel from a resolution expanded result with respect to said plurality of processing functions; or
    select said final output for each pixel as a result of halftoning said edge pixel based on said edge tag with respect to said pixel.

* * * * *